US012450100B2

(12) United States Patent
Djuhera et al.

(10) Patent No.: US 12,450,100 B2
(45) Date of Patent: Oct. 21, 2025

(54) AI MODEL BASED DEPLOYMENT OF AN AI MODEL

(71) Applicant: INTERNATIONAL BUSINESS MACHINES CORPORATION, Armonk, NY (US)

(72) Inventors: Aladin Djuhera, Dachau (DE); Alecio Pedro Delazari Binotto, Munich (DE); Fernando Luiz Koch, Palm Beach Gardens, FL (US); Rob High, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 18/539,572

(22) Filed: Dec. 14, 2023

(65) Prior Publication Data

US 2025/0117262 A1    Apr. 10, 2025

(30) Foreign Application Priority Data

Oct. 5, 2023   (GB) ..................... 2315267

(51) Int. Cl.
*G06F 9/50*       (2006.01)
*H04L 67/1004*    (2022.01)

(52) U.S. Cl.
CPC .......... *G06F 9/5072* (2013.01); *G06F 9/5027* (2013.01); *H04L 67/1004* (2013.01)

(58) Field of Classification Search
CPC ............... G06F 9/5072; G06F 9/5027; G06F 2209/5017; G06F 9/5088; G06F 9/505;

(Continued)

(56) References Cited

U.S. PATENT DOCUMENTS 10,601,907 B2 * 3/2020 Bermudez Hernandez ............. H04L 67/1008
2014/0359556 A1 * 12/2014 Jujare ................. G06F 8/10
                                                        717/104

(Continued)

FOREIGN PATENT DOCUMENTS

WO    2025/073705 A1    4/2025

OTHER PUBLICATIONS

Cheng, et al., "Joint Task Offloading and Resource Allocation for Mobile Edge Computing with Reinforcement Learning", GlobeCom 2020—2020 IEEE Global Communications Conference, Dec. 7-11, 2020, 8 Pages.

(Continued)

*Primary Examiner* — Wing F Chan
*Assistant Examiner* — John Fan
(74) *Attorney, Agent, or Firm* — Rakesh Roy

(57) ABSTRACT

A method, computer system, and a computer program product for executing workloads in a distributed system is provided. The present invention may include: determining a current resource utilization status in a distributed system; inputting, to a second AI model, the current resource utilization status and an in-use split configuration of a first AI model, the second AI model configured for predicting a split configuration for the first AI model; receiving an output from the second AI, the output indicating a current split configuration for the first AI model; splitting the first AI model using the current split configuration; deploying the split first AI model such that the input and output blocks may be executed on first computer systems of the set of first computer systems and such that the intermediate block may be executed on a second computer system of the at least one second computer system; executing the workload.

20 Claims, 7 Drawing Sheets

(58) Field of Classification Search
CPC ... H04L 67/1004; G06N 3/0499; G06N 3/063
USPC ........................................................ 709/226
See application file for complete search history.

(56) References Cited

U.S. PATENT DOCUMENTS

| | | | |
|---|---|---|---|
| 2018/0106661 A1 | 4/2018 | Cesari | |
| 2018/0225408 A1 | 8/2018 | Ziolo | |
| 2018/0365191 A1* | 12/2018 | Byzov | G06F 9/4856 |
| 2019/0005662 A1 | 1/2019 | Hirakawa | |
| 2019/0019082 A1 | 1/2019 | Dasgupta | |
| 2019/0068048 A1 | 2/2019 | Park | |
| 2019/0324437 A1 | 10/2019 | Cella | |
| 2019/0353277 A1 | 11/2019 | Sundareswara | |
| 2019/0354232 A1 | 11/2019 | Ding | |
| 2019/0370687 A1 | 12/2019 | Pezzillo | |
| 2020/0257604 A1 | 8/2020 | Roh | |
| 2020/0272859 A1 | 8/2020 | Iashyn | |
| 2020/0347017 A1 | 11/2020 | Satterfield | |
| 2020/0380306 A1 | 12/2020 | Hada | |
| 2022/0300618 A1 | 9/2022 | Ding | |
| 2023/0144662 A1* | 5/2023 | Tasinga | G06F 9/5088 718/105 |
| 2023/0161633 A1* | 5/2023 | Wang | G06F 9/505 718/105 |
| 2023/0206074 A1 | 6/2023 | Baek et al. | |
| 2023/0244953 A1* | 8/2023 | Park | G06N 3/098 706/15 |

OTHER PUBLICATIONS

Huang, et al., "Deep Reinforcement Learning for Online Computation Offloading in Wireless Powered Mobile-Edge Computing", arXiv:1808.01977v6 [cs.NI] Jul. 15, 2020, 13 Pages.

Kim, et al., "A Bargaining Game for Personalized, Energy Efficient Split Learning over Wireless Networks", arXiv:2212.06107v1 [cs.GT], Dec. 12, 2022, 6 Pages.

Li, et al., "Deep Reinforcement Learning based Computation Offloading and Resource Allocation for MEC", 2018 IEEE Wireless Communications and Networking Conference (WCNC), Jul. 13, 2023, 6 Pages.

Li, et al., "Deep reinforcement learning-based resource allocation and seamless handover in multi-access edge computing based on SDN", Springer, Knowledge and Information systems, Jul. 21, 2021, pp. 2479-2511.

Li, et al., "Federated Deep Reinforcement Learning for Energy-Efficient Edge Computing Offloading and Resource Allocation in Industrial Internet", MDPI Applied Sciences, May 31, 2023, pp. 1-24.

Nath, et al., "A Deep Reinforcement Learning Based Framework for Dynamic Computation Offloading and Resource Allocation in Multi-Access Edge Computing Networks", Intelligent and Converged Networks, 2020, 1 Page. (Abstract).

Zhang, et al., "Deep Reinforcement Learning-Based Offloading Decision Optimization in Mobile Edge Computing", 2019, IEEE Wireless Communications and Networking Conference (WCNC), Apr. 15-18, 2019, 9 Pages.

He, et al., "Joint DNN Partition Deployment and Resource Allocation for Delay-Sensitive Deep Learning Inference in IoT", IEEE internet of Things Journal, vol. 7, No. Oct. 10, 2020, 14 Pages.

Tang, et all, "Joint Multiuser DNN Partitioning and Computational Resource Allocation for Collaborative Edge Intelligence", IEEE Internet of Things Journal, vol. 8, No. 12, Jun. 15, 2021, 12 Pages.

United Kingdom Patent Office, International Search Report, GB Application No. GB2315267.1, Dated Mar. 21, 2024, 4 Pages.

International Searching Authority, "Notification of Transmittal of the International Search Report and the Written Opinion of the International Searching Authority, or Declaration," Patent Cooperation Treaty, Dec. 19, 2024, 16 pages, International Application No.—PCT/ EP2024/077624.

Kim et al., "Auto Scale: Energy Efficiency Optimization for Stochastic Edge Inference Using Reinforcement Learning", 2020 53rd Annual IEEE/ACM International Symposium On Microarchitecture (Micro), Oct. 17, 2020, 15 Pages.

* cited by examiner

AI MODEL BASED DEPLOYMENT OF AN AI MODEL

BACKGROUND

The present invention relates to the field of digital computer systems, and more specifically, to executing workloads in a distributed system.

A radio access network (RAN) may provide access to and coordinate the management of resources across sites of a mobile telecommunication system in accordance with a protocol stack. The RAN may provide processing resources which may, for example, be used to infer artificial intelligence (AI) models. However, there is a need to introduce AI models which need to be processed efficiently on constrained computing environments.

SUMMARY

Various embodiments provide a method for executing workloads in a distributed system, computer program product and system as described by the subject matter of the independent claims. Advantageous embodiments are described in the dependent claims. Embodiments of the present invention can be freely combined with each other if they are not mutually exclusive.

In one aspect, the invention relates to a method for executing workloads in a distributed system using a first AI model, the distributed system comprising a set of first computer systems which are configured to connect to at least one second computer system of the distributed system, the first AI model being configured to receive a specific input, process the specific input and provide a specific output, the first AI model being configured to be split in accordance with a split configuration into a set of one or more input blocks, an intermediate block and a set of one or more output blocks, such that the set of one or more input blocks receive the specific input and provides an intermediate output, the intermediate block receives as input the intermediate output and provides another intermediate output, and the set of one or more output blocks receive as input the other intermediate output and provides said specific output; the method comprising a split method comprising: receiving a request to execute a workload using the first AI model, the workload comprising the specific input; determining a current resource utilization status in the distributed system; inputting, to a second AI model, the current resource utilization status and an in-use split configuration of the first AI model, the second AI model being configured for predicting a split configuration for the first AI model; receiving an output from the second AI, the output indicating a current split configuration for the first AI model; the method further comprising: splitting the first AI model using the current split configuration; deploying the split first AI model such that the input and output blocks may be executed on one or more first computer systems of the set of first computer systems and such that the intermediate block may be executed on a second computer system of the at least one second computer system; executing the workload.

In one aspect the invention relates to a computer program product comprising a computer-readable storage medium having computer-readable program code embodied therewith, the computer-readable program code configured to implement the method of the above embodiment.

In one aspect the invention relates to a computer system for executing workloads in a distributed system using a first AI model, the distributed system comprising a set of first computer systems which are configured to connect to at least one second computer system of the distributed system, the first AI model being configured to receive a specific input, process the specific input and provide a specific output, the first AI model being configured to be split in accordance with a split configuration into a set of one or more input blocks, an intermediate block and a set of one or more output blocks, such that the set of one or more input blocks receive the specific input and provides an intermediate output, the intermediate block receives as input the intermediate output and provides another intermediate output, and the set of one or more output blocks receive as input the other intermediate output and provides said specific output; the computer system being configured for: receiving a request to execute a workload using the first AI model, the workload comprising the specific input; determining a current resource utilization status in the distributed system; inputting, to a second AI model, the current resource utilization status and an in-use split configuration of the first AI model, the second AI model being configured for predicting a split configuration for the first AI model; receiving an output from the second AI, the output indicating a current split configuration for the first AI model; splitting the first AI model using the current split configuration; deploying the split first AI model such that the input and output blocks may be executed on one or more first computer systems of the set of first computer systems and such that the intermediate block may be executed on a second computer system of the at least one second computer system; executing the workload.

BRIEF DESCRIPTION OF THE DRAWINGS

In the following embodiments of the invention are explained in greater detail, by way of example only, making reference to the drawings in which.

DETAILED DESCRIPTION

Figure 1:
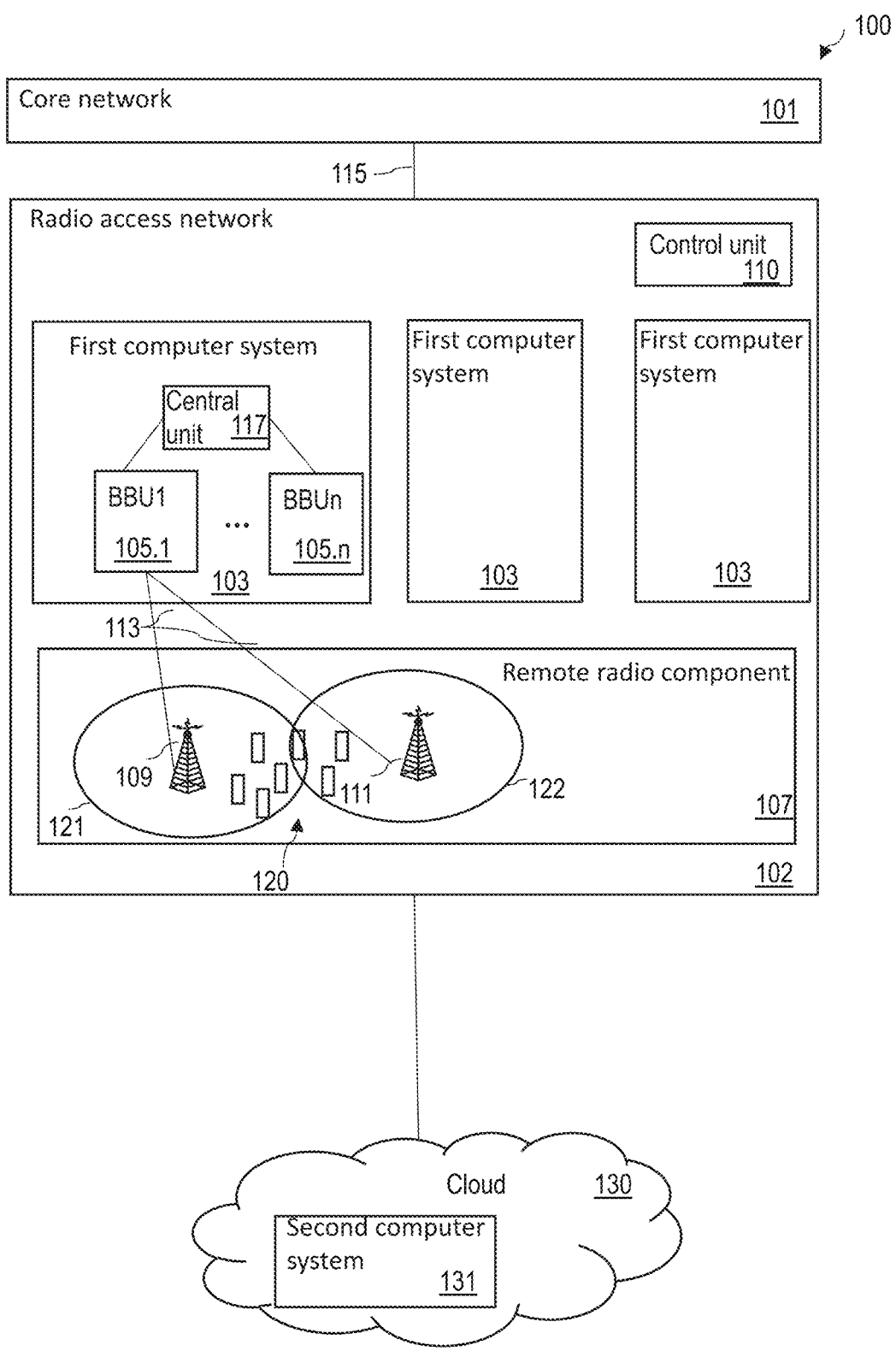
FIG. 1 is a block diagram of a wireless communication system in accordance with at least one embodiment of the present disclosure.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The first AI model may be configured to perform a task. The task may refer to a type of prediction or inference being made. The task may be based on the problem or question that is being asked, and the available data. The task may, for example, be a classification task, clustering task or a prediction task. For example, the classification task assigns data to categories, and the clustering task groups data according to similarity. The first AI model may perform the task by receiving input data, processing the input data using a set of learnable parameters and providing an output that represents the result of the task. The first AI model may be provided as deep neural network, transformer or another AI model that can be split into blocks as described herein.

The first AI model may be configured to receive an input X and provide an output Y. The first AI model may be configured to be split in accordance with a split configuration into a set of one or more input blocks, an intermediate block, and a set of one or more output blocks. For example, the first AI model may be configured to be split in accordance with a split configuration into an input block, an intermediate block, and an output block. The splitting of the first AI model may be performed into any number of blocks provided that if the same input X is used as input to the split model, the same output Y may be obtained. The split configuration may define how the first AI model may be split. For example, the split configuration may comprise a number of blocks into which the first AI model may be split and a split ratio indicating the fraction of the task of the first AI model that may be performed by every block.

The present subject matter may provide an accurate and systematic splitting of the first AI model by using a second AI model. The terms "First," or "Second," are used as labels for nouns that they precede, and do not imply any type of ordering (e.g., spatial, temporal, logical) unless explicitly defined as such. The second AI model may be a trained AI model. The second AI model may be trained to receive as input the current resource utilization status in the distributed system and the split configuration being used for splitting the first AI model. The split configuration being used for splitting the first AI model may be referred to as the "in-use split configuration". The in-use split configuration may be the split configuration being used by the computer system e.g., the first computer system, that executes the method in order to split the first AI model. In response to receiving said input, the second AI model may predict a current or new split configuration that may be used to split the first AI model. The input of the second AI model may be referred to as splitting input and the output of the second AI model may be referred to as splitting output.

The splitting input may comprise values representing the current resource utilization status and in-use split configuration. For example, utilization parameters that describe the resource utilization may be provided such that the determination of the current resource utilization status is performed by evaluating the utilization parameters. The in-use split configuration may be represented or defined by values of configuration parameters. Hence, the splitting input of the second AI model may comprise values of the utilization parameters and the configuration parameters respectively. The splitting output of the second AI model may comprise values of the configuration parameters respectively.

The predicted current split configuration may be used to split the first AI model. The splitting of the first AI model may result in three blocks S1, S2 and S3, where S1 is the input block, S2 is the intermediate block and S3 is the output block. In one example, the number of blocks may be higher by splitting the input block S1 into n1 input sub-blocks S1(a), S1(b) .... S1 (n1) and splitting the output block S3 into n2 output sub-blocks S3(a), S3(b) .... S3 (n2) where n1 and n2 are greater than or equal to two. This may result in a number of blocks equal to n1+n2+1. In the following and for simplification of the description, each of the input sub-blocks S1(a), S1(b) .... S1 (n1) may be referred to as input block. Similarly, each of the output sub-blocks S3(a), S3(b) .... S3 (n2) may be referred to as output block. That is, the first AI model may be split into one or more input blocks, one or more output blocks and one intermediate block.

The splitting of the first AI model may result in a number of blocks having their respective structure. The structure of the block may, for example, refer to the type of input and output of the block and the number and type of operations performed by the block e.g., if the first AI model is a deep neural network, the structure of the block may be defined by the number of layers that belong to the block, wherein the number of layers may represent a specific number and type of operations performed by the first AI model.

The execution of the first AI model may be performed in accordance with an execution pipeline. The execution pipeline may comprise three or more sequential execution stages, wherein each execution stage is configured to receive an input, process the input using a subset of the learnable parameters and provide an output. The input of one execution stage, which is not the first execution stage, may be the output of the preceding execution stage. For example, the input block S1 may represent one or more first execution stages of the pipeline, the output block S3 may represent one or more last execution stages of the pipeline and the intermediate block S2 may represent the remaining execution stages. For example, in case of a deep neural network, an execution stage may represent the processing of one or more layers of the deep neural network. The processing performed for one network layer may, for example, comprise weighting operations, convolution operations or activation operations. The first AI model may be split at two cut layers, and the intermediate output may, for example, comprise cut layer activations. In general, the present model splitting may be applied for various AI architectures such as Convolutional Neural Networks (CNNs) or other AI architectures such as Transformers, Resnet, Long short-term memory (LSTM) network, or an AI model that can be executed in accordance with an execution pipeline as described above.

Different workloads may use the first AI model to perform the task assigned to the first AI model. The workload may refer to one or more software applications and data accessed by the one or more software applications. For example, the workload may comprise multiple steps wherein one or more steps may comprise the step of inputting input data to the first AI model in order to obtain the output associated with the input data. The output may further be used by other steps of the workflow e.g., if the first AI model is trained to predict whether a communication channel is reliable or not, a workflow for data scheduling may use the first AI model to find the reliable channels in order to schedule communication on them. In another example, the first AI model may be trained for facial recognition of users, where the result of the recognition may be used to enable service access to the users.

These workloads may efficiently be executed in accordance with the present subject matter using the distributed system. The distributed system comprises the multiple first computer systems which are remotely connected to the one or more second computer systems. The first computer system may be a local computer system e.g., accessible to users. The second computer system may not be part of the first computer system. The second computer system may be remote from the first computer system. The first computer system may be configured to connect to the second computer system by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN), all or a portion of the Internet, any other communication system or systems at one or more locations or a combination thereof.

Thus, the present subject matter may provide an accurate method for an optimal execution of workflows using available resources. By contrast to existing techniques, the present subject matter may not only search for the resources to execute a program but also adapt the structure of the program itself in order to find the optimal combination of resources. The present example may find a trade-off between the secure execution of the first AI model and the available processing resources. The execution may be secure because the input and output of the first AI model are processed locally at the first computer system(s). This may prevent issues such as model inversion attacks by malicious parties as well as reverse engineering attempts of sensitive input data and/or output labels by either malicious parties and/or honest-but-curious servers e.g., in the cloud.

The present subject matter may provide an optimal model splitting e.g., S=(S1, S2, S3), given the current deployments specific computational and network situation at an edge node, such that stringent quality of service (QOS) or other performance metrics may be met. The optimal model splitting can be learned adaptively, so as to derive an intelligent set of split configurations which define split ratios that can be applied to unforeseen and changing computational and network situations. The changing environments and requirements may be mapped into suitable input variables to the split method.

The second AI model may be a trained model, wherein the training may be performed in order to find an optimal split configuration for a given state of the environment. The second AI model may be trained regularly (e.g., on a time periodic basis) to provide accurate policies that reflect the changing status of the distributed system. The second AI model may be trained using reinforcement learning or other learning techniques such as supervised learning, self-supervised learning, transfer learning, evolutionary algorithms, semi-supervised learning, federated learning, but it is not limited to such learning techniques. The second AI model may, for example, be trained using reinforcement learning and thus may be referred to as a reinforcement learning model.

According to one example, the second AI model is a reinforcement learning model. A state of the reinforcement learning model is defined by the current resource utilization status and the in-use split configuration. The distributed system may define the environment for the reinforcement learning model. The state of the reinforcement learning model may be a state of the environment. The policy of the reinforcement learning model may define an action to change the in-use split configuration of the first AI model based on the state. The reinforcement learning model may comprise a trained agent that uses the policy to define an action to change the in-use split configuration using the current state of the environment or that uses the policy to predict the current split configuration using the current state of the environment. The reinforcement learning may enable the agent to learn an optimal policy for splitting the first AI model that optimizes (e.g., maximizes) a reward. The reward may for example be defined using the execution time of the split first AI model or duration of one inference execution of the split first AI model. The trained agent may be configured to receive the splitting input and to predict or define the current or new split configuration for splitting the first AI model.

The present method may be executed by a first computer system (e.g., edge node) of the set of first computer systems. The input and output blocks of the resulting split first AI model may be executed by said first computer system and the intermediate block may be executed by the second computer system. The current resource utilization status may, for example, be dependent on the first computer system on which the method is executed. For example, the current resource utilization status may indicate the resource utilization of the first computer system on which the method is executed and the network condition which is collected by (from the point of view of) the first computer system on which the method is executed.

According to one example, the second AI model is trained in multiple first computer systems in accordance with a federated learning technique. Each of the multiple first computer systems may comprise an instance of the second AI model and may train that instance using its respective collected training data, wherein the training data includes the resource utilization status and the in-use split configuration being used by the each first computer system. The resource utilization status may be dependent on the first computer system that determines it. Each first computer system may have a different resource utilization status depending on the other workloads that are running on this particular computer system. Thus, each instance of the second AI model may get different inputs to deal with it. The first computer systems may not share data or current resource utilizations with each other. And the resource utilizations may be different e.g., the MEC edge nodes might have additional services. This example may enable to collaboratively share knowledge and policies from similar distributed inference tasks, so as to dynamically update a global set of policies in order to achieve a more informed and robust model splitting mechanism.

According to one example, the training in accordance with the federated learning technique comprises: combining learnable weights of the second AI models in the respective first computer systems, resulting in a combined second AI model, wherein the second AI model used in the split method is the combined second AI model.

For example, a control unit (e.g., in one of the first computer systems) may issue a request to each of the multiple first computer systems to send a copy of their learnable weights of their respective instance of the second AI model. The control unit may aggregate the weights via a specified Federated Learning aggregation strategy such as Federated Averaging. The control unit may issue a request to each of the multiple first computer systems to receive a copy of the globally federated second AI model and to subsequently update the respective instance by the globally federated second AI model.

According to on example, the second AI model is a Deep Q Neural Network (DQNN).

According to one example, the method is repeatedly performed, wherein the split method further comprises: retraining an instance of the second AI model; and upon a successful retraining, using the retrained second AI model instead of the second AI model for further execution of the split method. E.g., if the retraining ends and is successful in the n-th iteration of the split method, the next (n+1)-th and higher iteration may use the retrained second AI model.

The first AI model may be deployed using a deployment configuration. This may provide a flexible and optimal execution of the split model. Indeed, the splitting based on the resource utilization status may indicate that the blocks can be executed on a specific first computer system, namely the first computer system that performed the method and a specific second computer system. However, the deployment configuration may be advantageous in case the input and output blocks may be executed in one or more first computer systems in addition to or instead of the specific first computer system that performed the method and in case the intermediate block is to be executed in another or in an additional second computer system than the specific second computer system. The deployment configuration may be defined by at least one of: a second computer system to execute the intermediate block, and the one or more first computer systems to execute the input and output blocks of the first AI model. For example, in case the first AI model is split into three blocks S1, S2 and S3, the one or more first computer systems may process the input and output blocks S1 and S3. In case the first AI model is split into a higher number (e.g., n1+n2+1 blocks) of blocks S1(a), S1(b) .... S1 (n1), S2, S3(a), S3(b) ... and S3 (n2), the one or more first computer systems may process the n1+n2 input and output blocks S1(a), S1(b) .... S1 (n1), S3(a), S3(b) ... and S3 (n2).

The present subject matter may provide advantageous techniques for defining the deployment configuration using the current resource utilization status. The definition of the deployment configuration may further be based on an estimate of required resources by each processing stage or processing step of the first AI model. The resources required by each block of the first AI model may be referred to as required block resources.

The deployment configuration may, for example, be determined using the current resource utilization status. According to one example, using the current resource utilization status to define the deployment configuration comprises: performing a capacity profiling of the first and second computer systems to determine whether each of the first and second computer systems can execute one or more blocks of the AI model; and defining the deployment configuration based on the capacity profiling.

According to one example, the utilization parameters comprise at least one of: utilization level of network resources of the distributed system by the first computer system that performs the method; utilization level of resources of one or more of the first computer systems including the first computer system that performs the method; utilization level of resources of the second computer systems; or resources in each of the one or more first and second computer systems. For example, the utilization parameters may comprise a set of hardware specifications such as RAM, CPU, Memory, Cache of the first computer system on which the method is performed, information about the computational situation (e.g., hardware utilization, node occupation), and information about the network situation (e.g., link reliability, latency, data transfer speeds). According to one example, the configuration parameter may comprise any one of: maximum number of blocks of the model, minimum number of blocks of the model, and maximum resource usage by each block. In one example, the processing resources required by each block of the blocks of the first AI model may be estimated. The current resource utilization status of the distributed system may be used to identify the first and second computer systems that can run the blocks given the estimated processing resources.

According to one example, the distributed system is a wireless communication system, wherein the first computer systems are multi-access edge computing (MEC) nodes and the second computer system is a cloud system. The second computer system may be part of a public cloud, or private cloud or a hybrid cloud. For example, multiple public clouds, private clouds and hybrid clouds may be provided, wherein each of the clouds may provide resources for a second computer system (e.g., the cloud may provide the second computer system as a virtual machine). For example, for the definition of the deployment configuration, a specific cloud may first be selected and then the second computer system provided by the selected cloud may be used for the deployment configuration. The multiple clouds may be provided by a same cloud service provider or by different cloud service providers.

According to one example, the first AI model may be provided as a neural network (e.g., deep neural network), a transformer or any other AI model and corresponding architecture (e.g., in terms of parallelization, distribution) that can be split into blocks as described in the method herein. The input block may represent first network layers, the intermediate block may represent middle network layers; and the output block may represent last network layers.

According to one example, the workload involves at least one of: data analytics, sensor measurement fusion from different sources, image analysis, processing data streams destined to a cloud or another internal or external workload. The internal workload may be the workload running on the first computer system that executes the present method while the external workload may be the workload executed on a system external to the first computer system and used by the first computer system. For example, any other intensive workload e.g., internally from other services running, externally from services that are operating by the providing computing instance (e.g., network operator in MEC nodes), other ML models inference and training, etc.

The execution of the workflow comprises executing the first AI model one or more times. The execution of the first AI model may comprise providing an input to the first AI model and receiving an output of the first AI model. According to one example, the executing of the first AI model comprises: for each two consecutive blocks of the first AI model which are deployed on different systems: encoding using an encoding protocol the output of the first block of the two blocks, and sending the encoded output to the first computer system or to the second computer system in order to be used as input for the second block of the two blocks. In one example of a first AI model being split into more than three blocks, if input blocks S1(a) and S1(b) are deployed on two first computer systems respectively, the output of input block S1(a) may be encoded by the encoding protocol and the encoded output may be sent to the first computer system where S1(b) is deployed. The output may be decoded at the receiving first computer system using the encoding protocol and then used as input for block S1(b). In another example of a first AI model being split into three blocks, the output of input block S1 may be encoded by the encoding protocol and the encoded output may be sent to the second computer system where S2 is deployed. The output may be decoded at the second computer system using the encoding protocol and then used as input for block S2. Similarly, the output of main block S2 may be encoded by the encoding protocol and the encoded output may be sent to the first computer system where input block S3 is deployed. The output may be decoded at the first computer system using the encoding protocol and then used as input for block S3.

According to one example, the encoding protocol comprises at least one of compression or encryption.

The encoding protocol may define a method of encoding of original data to obtain encoded data and define corresponding method of decoding that enables to restore the original data from the encoded data. The encoding of data may include any one of: encrypting, compressing, ciphering, formatting, or the assignment or interpretation of specific bit patterns to the data. This may secure communication of data. Alternatively, or additionally, this may ensure efficient utilization of network resources e.g., because compression may reduce the data size. For example, in case the encoding is performed by compressing the output, the decoding of the compressed output is performed by decompressing the compressed output. In case the encoding is performed by encrypting the output, the decoding of the encrypted output is performed by decrypting the encrypted output.

The present subject matter may have the following advantages. The present subject matter may introduce applicable data-preserving operations for AI models to operate efficiently on constrained computing devices. The present subject matter may ensure optimal transmitted data sizes to ensure efficient utilization of network resources. The present subject matter may adjust the data preservation operations to cope with the variations of computing resource availability on constrained computing devices. The present subject matter may dynamically schedule model split ratios for AI models to distribute the inferencing task across constrained first computer systems (e.g., edge computing devices) and second computer systems (e.g., cloud server instances). The present subject matter may introduce security for distributed inference using large and complex AI models (e.g., Foundation Models) which may be processed efficiently on constrained computing environments, such as Edge computing and Internet of Things (IoT) devices.

According to one example, before executing the one or more input blocks, the one or more output blocks may be deleted from the first computer systems. For example, a management server may distribute the input block(s), the intermediate block and the output block(s) to the first computer system(s) and second computer system, respectively, while ensuring that the first computer system(s) can only process either the input block(s) or output block(s) at each time instance to ensure maximum utilization of hardware resources, e.g., the input block configuration may be deleted after execution, the encoding and the transmission to free up computational power for the output block. The management server may, for example, be configured to connect to the first and second computer systems and control operations of the first and second computer systems.

According to one example, after executing the one or more input blocks, the one or more output blocks may be deployed into the first computer system(s). For example, the one or more output blocks may be downloaded from the management server after execution of the one or more input blocks. This may further improve the resource usage of the first computer system because processing resources for maintaining the output block may be saved while the output block is not being used.

According to one example, after executing the one or more input blocks, the input blocks may be deleted and the one or more output blocks may be deployed into the first computer system. For example, the one or more output blocks may be downloaded from the management server after execution of the one or more input blocks. This may further improve the resource usage of the first computer system because only one block type may be processed and managed at a time by the first computer system(s).

According to one example, the execution of the first AI model comprises execution of a succession of processing steps, wherein the splitting of the first AI model may result in the input block performing a first number (N1) of first successive processing steps and the output block performing a third number (N3) of last successive processing steps, wherein the intermediate block is configured to perform a second number (N2) of successive processing steps that follow the first processing steps of the input block, wherein the sum of the first number, second number and the third number is the total number of processing steps in the AI model, that is, N1+N2+N3 is the number of processing steps of the first AI model. The execution stages of the first AI model which are defined before may comprise one or more processing steps of the first AI model. In case the input block is further split to multiple input blocks, N1 refers to the first successive processing steps performed by all the input blocks. Similarly, in case the output block is further split to multiple output blocks, N3 refers to the last successive processing steps performed by all the output blocks.

The intermediate block may be referred to as the main block as it may comprise most of the processing steps of the first AI model.

According to one example, the first AI model is a trained model. In this case, the execution of the first AI model using the present method is an inference of the first AI model.

According to one example, the set of first computer systems has a first amount of processing resources which is smaller than a second amount of processing resources of the at least one second computer system. The second computer system may, for example, be any computer system that has processing resources for executing any defined intermediate block of the AI model. For example, the second computer system may be any computer system that has processing resources for executing the whole first AI model.

According to one example, the second computer system is provided as a service in a cloud computing environment. In one example, the second computer system may be provided as a cloud instance in the cloud computing environment. The cloud instance may be a server resource provided by cloud services. In one example, the second computer system may be implemented using one or more functional abstraction layers provided by the cloud computing environment e.g., the hardware and software resources of the second computer system may be provided by the hardware and software layer of the cloud computing environment. The workload layer of the cloud computing environment may for example be used to implement the steps to be executed by the second computer system. The cloud computing environment may remain unaware of any data and output labels as it does not possess the complete first AI model and external model inversion and/or reverse-engineering attacks may be mitigated by the secure model encoding, thus preserving data.

The inference may thus take place exclusively and securely at the edge device, making use of the cloud environment as a pure computing and processing instance without knowledge about the particular use case and inference outcomes of the edge device.

According to one example, the first AI model is a foundation model. The foundation model may be a large AI model trained on a vast quantity of data at scale resulting in a model that can be adapted to a wide range of downstream tasks. Examples of foundation models include Bidirectional Encoder Representations from Transformers (BERT) and the Generative Pre-trained Transformer n series (GPT-n series). The first and last foundation model (FM) layers are processed on-device and their intermediate cut-layer activations are securely transmitted (received) by applying compression (decompression) while guaranteeing communication efficient low-bandwidth transmissions.

According to one example, the first AI model is a deep neural network, wherein the input block represents first network layers, the intermediate block represents middle network layers; and the output block represents last network layers. Following this example, each processing step of the first AI model may represent the processing performed for a respective layer of the deep neural network. That is, the input block comprises N1 first layers of the deep neural network, the intermediate block comprises N2 layers of the deep neural network and the output block comprises N3 last layers of the deep neural network, where the total number of layers in the deep neural network is N1+N2+N3.

According to one example, the first computer system is any one of: edge device (e.g., such as a MEC node), user equipment (UE) or an internet of things (IoT) device. This example may be seamlessly integrated in wireless or mobile communication systems. The mobile communication system provides wireless connectivity to users. The users may, for example, comprise mobile devices, tablets, laptops or individuals. The mobile communication system may comprise a radio access network (RAN) and a core network. The core network may provide Internet Protocol (IP) connectivity to the radio access network. The radio access network may manage the radio spectrum of users using radio devices such as base stations. The radio access network may enable to process packets in accordance with a processing pipeline. The processing pipeline has different layers. The layers include baseband processing layers and radio frequency (RF) processing layers. The baseband processing layers may be defined in accordance with a protocol stack and may be performed by a baseband unit, wherein the baseband unit is comprised in the edge device.

The baseband unit may be associated with one or more base stations. For example, each base station of the one or more base stations may serve users located within the base station's geographical area of service or a cell. The baseband unit may process baseband signals for served users of the one or more base stations. Thus, the baseband unit is said to be serving said users. The baseband unit may implement the layers of the protocol stack such as the Packet Data Convergence Protocol (PDCP) layer, Radio Link Control (RLC) layer, Medium Access Control (MAC) layer and Physical (PHY) layer. In one example, the baseband unit may be divided into function entities each being configured to perform a respective function e.g., a function may implement one or more layers of the stack protocol. For example, the baseband unit may be divided into two function entities named Centralized Unit (CU) and Distributed Unit (DU). The CU may provide support for the higher layers of the protocol stack such as the PDCP layer while the DU provides support for the lower layers of the protocol stack such as the RLC, MAC and Physical layers.

The implementation of the baseband unit may be realized with a specific hardware and software configuration of the edge device. The software configuration of the baseband unit may comprise an operating system and software modules for performing the functions of the baseband unit. In addition, the software configuration may indicate one or more vendors that provide the software configuration. For example, the operating system and software modules may be provided by one or more vendors. The hardware configuration may comprise storage resources, data communication resources and processing resources. In addition, the hardware configuration may indicate one or more vendors that provide the hardware configuration. The resources may be provided by one or more vendors.

FIG. 1 depicts a diagram of a wireless communication system according to at least one embodiment.

The wireless communication system 100 comprises a core network 101 and a radio access network 102. The radio access network 102 may comprise a remote radio component 107 equipped by, but not limited to, base stations 109 and 111. Each base station 109 or 111 may comprise a remote radio unit (RRU) with antennas and may serve UEs 120 in respective cells 121 and 122. The radio access network 102 may further comprise first computer systems 103. For simplification of the description only three first computer systems are shown but it is not limited to that number. Also, only components of one first computer system are described for simplification of the drawings.

The first computer system 103 may, for example, comprise a set of one or more baseband units (BBUs) 105.1-$n$. The baseband unit may be connected to a respective RRU in the remote radio component 107 through a fiber or cable 113. The first computer system 103 may be configured to connect to the core network 101 via a backhaul link 115. The first computer system 103 may comprise a central unit 117 which is configured to control the operation and deployment of the baseband units 105.1-$n$. Each of the first computer systems 103 may, for example, be provided as a MEC node. The MEC nodes may improve user services (e.g., with a low latency). The first computer system 103 may, for example, process data provided by the BBUs using advanced techniques e.g., for image analysis. The radio access network 102 may comprise a control unit 110 for managing workloads in the wireless communication system 100. Although shown as separate component, the control unit 110 may be in another example part of the one or more first computer systems 103.

The remote radio component 107 and the first computer system 103 may be configured to connect to a cloud computing environment 130. The cloud computing environment 130 may comprise a second computer system 131. In one example, the second computer system 131 may be provided as a cloud instance in the cloud computing environment 130.

In one example implementation, the cloud computing environment 130 may, for example, be provided as described with reference to FIGS. 8 and 9. For example, the second computer system 131 may be implemented using one or more functional abstraction layers provided by the cloud computing environment 130 e.g., the hardware and software resources of the second computer system 131 may be provided by the hardware and software layer of the cloud computing environment 130. The workload layer of the cloud computing environment 130 may for example be used to implement the execution of the main block of the AI model by the second computer system 131.

In one example implementation, the system 100 may be provided as an Open Radio Access Network (O-RAN), where the first computer system 103 may be in one or more edge sites and the remote radio component 107 may be in one or more cell sites.

The first computer system 103 and the control unit 110 may comprise a second AI model. The second AI model may be trained to receive a current resource utilization status and an in-use split configuration of the first AI model and predict a split configuration for the first AI mode. The first AI model may be configured to receive a specific input, process the specific input, and provide a specific output. The first AI model is configured to be split in accordance with the split configuration into a set of one or more input blocks, an intermediate block and a set of one or more output blocks, such that the set of one or more input blocks receive the specific input and provides an intermediate output, the intermediate block receives as input the intermediate output and provides another intermediate output, and the set of one or more output blocks receive as input the other intermediate output and provides said specific output.

Figure 2:
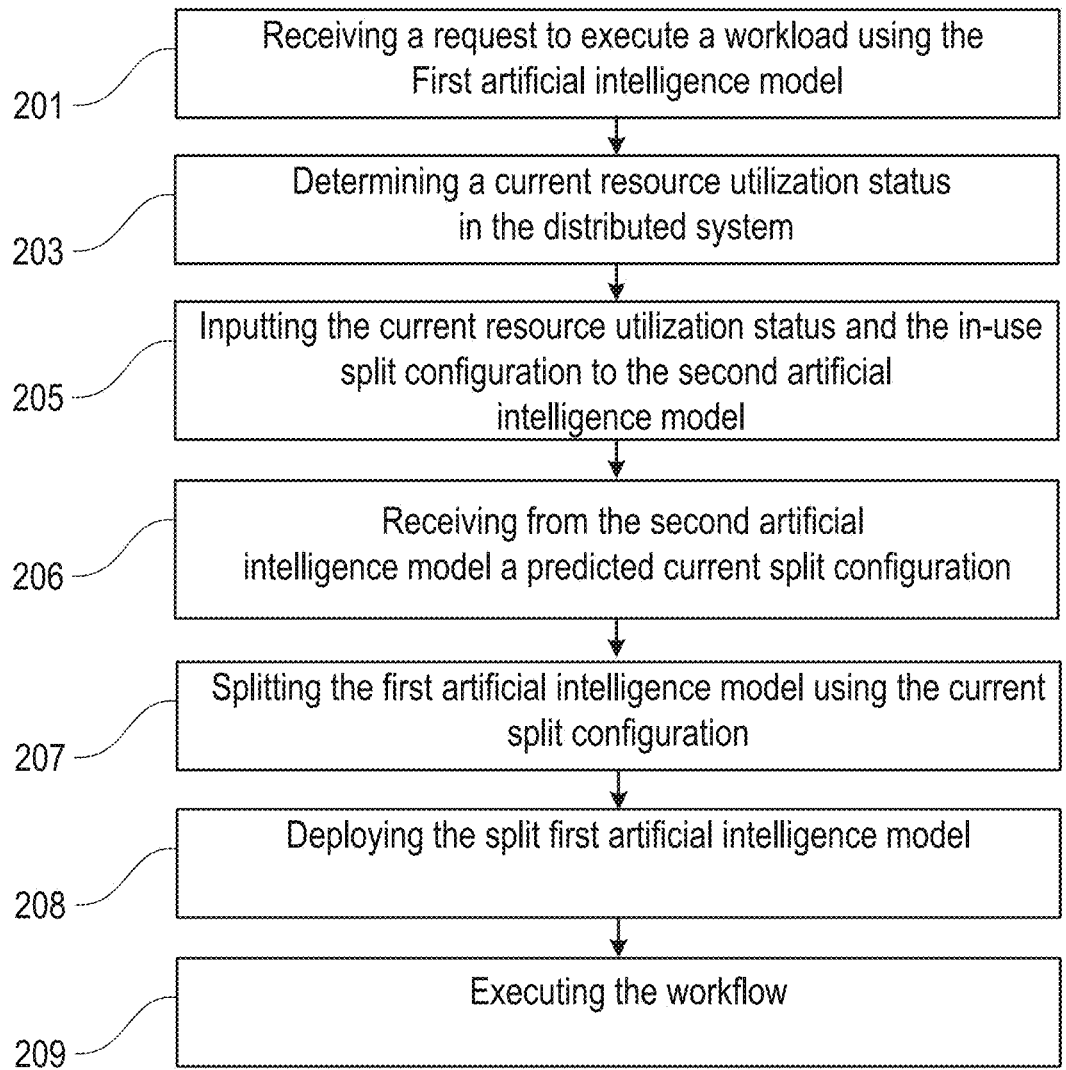
FIG. 2 is a flowchart of a method for executing workloads in a distributed system in accordance with at least one embodiment of the present disclosure.

FIG. 2 illustrates a flowchart of a process for executing an AI model in accordance with at least one embodiment. In one embodiment, the process of FIG. 2 may be implemented in the system of FIG. 1, but it is not limited to that system. The process may, for example, be performed by the control unit 110 or the first computer system 103.

A request to execute a workload using the AI model may be received in step 201. The workload may comprise a step of receiving the specific input to be used as input of the first AI model. A current resource utilization status in the distributed system may be determined in step 203.

The current resource utilization status and the in-use split configuration may be input in step 205 to the second AI model in order to receive in step 206 from the second AI, a predicted current split configuration for the first AI model.

The first AI model may be split in step 207 using the current split configuration. The first AI model may be deployed in step 208. The workload may be executed in step 209.

The process may, for example, be performed by the first computer system 103. The first computer system 103 may control execution of the workload in step 209 in the first computer system 103 and other systems such as the second computer system 131. The execution of the workload may comprise the execution of the input and output blocks of the deployed first AI model at the first computer system and the execution of the intermediate block at the second computer system.

The process may efficiently, adaptively and collaboratively learn and infer optimal model split ratios. The adaptive and self-learning rule, especially with respect to time-varying edge environments, may result in optimal split ratios with, for example, reduced inference processing overhead at the edge node, reduced susceptibility to model inversion attacks if the edge node is scheduled to barely process any layers, reduced latency due to balanced and not lengthy computations.

Figure 3:
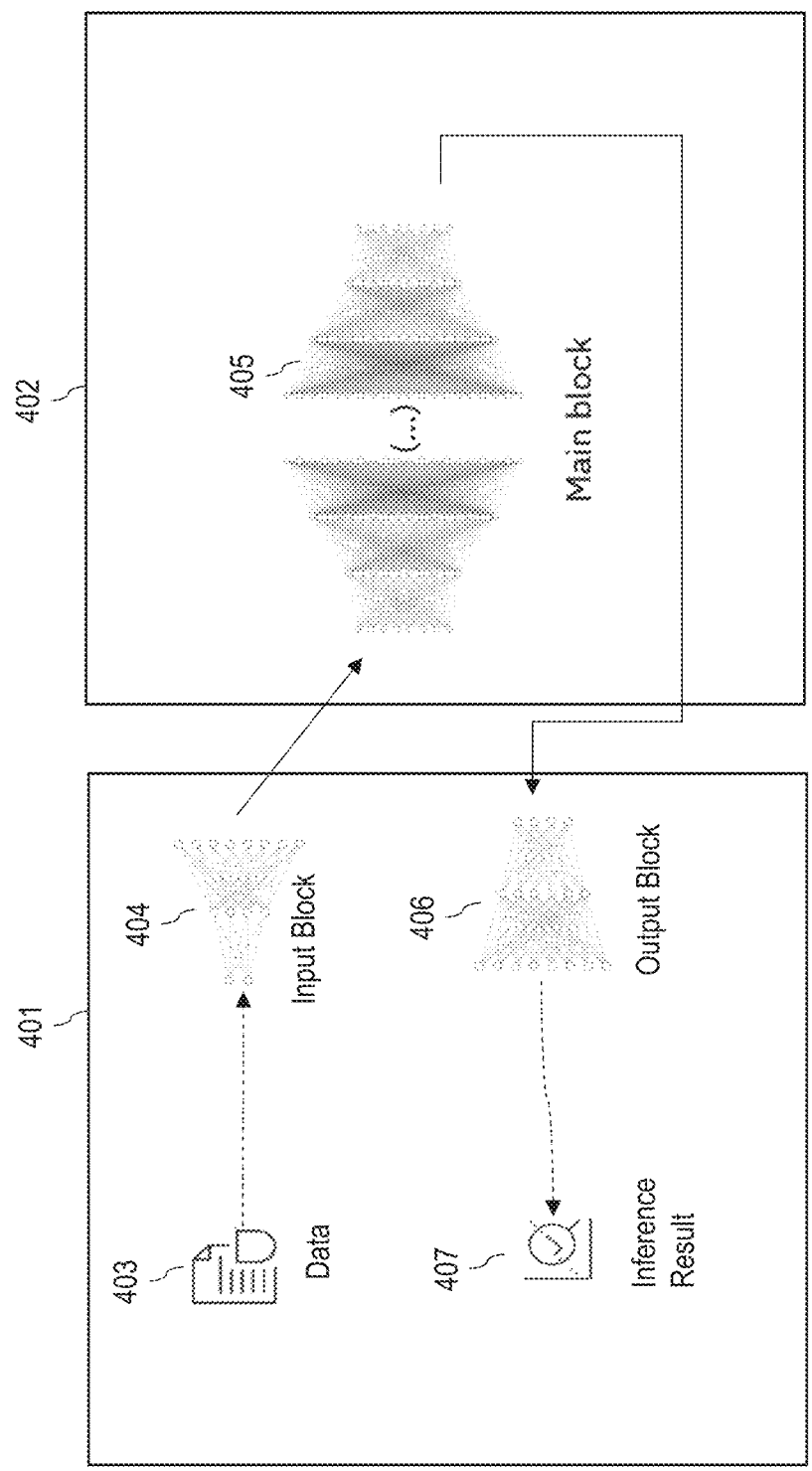
FIG. 3 is a diagram illustrating the deployment of a split Foundation Model in accordance with at least one embodiment of the present disclosure.

FIG. 3 is a diagram illustrating the deployments of a split Foundation Model according to at least one embodiment. The Foundation Model may be split into three blocks. As shown, a first computer system 401 may comprise the input block 404 and the output block 406 while a remote second computer system 402 comprises the main block 405. The input data 403 may be received at the first computer system 401 and processed by the input block 404. The output of the input block 404 may be processed by the main block 405 in the second computer system 402. In turn, the output of the main block 405 may be processed by the output block 406 to obtain an inference result 407 of the input data 403.

Figure 4:
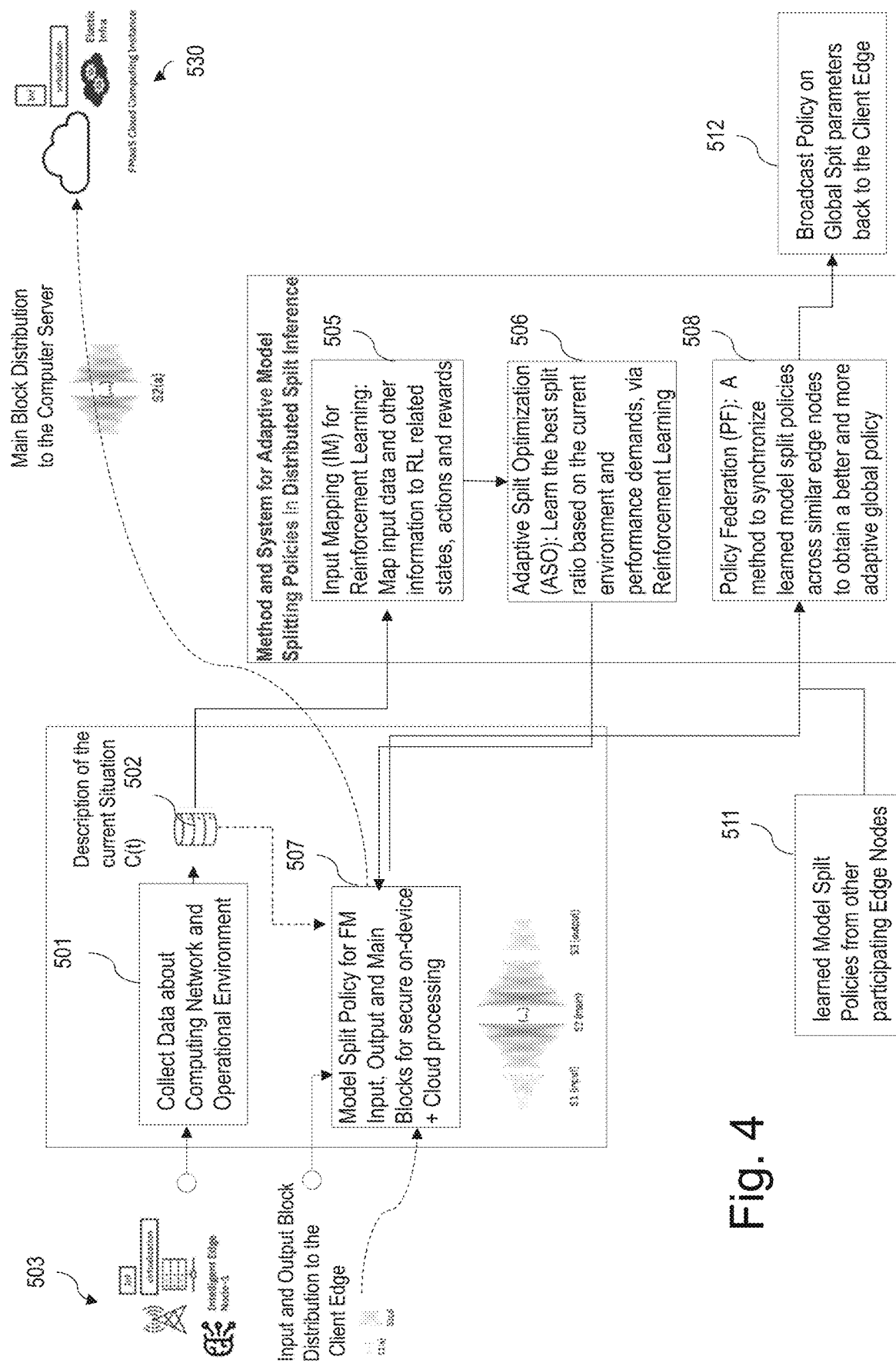
FIG. 4 is a diagram illustrating a method for executing workloads in a distributed system in accordance with at least one embodiment of the present disclosure.

FIG. 4 is a diagram illustrating a method for workload orchestration in a distributed system in accordance with at least one embodiment.

The second AI model may, for example, be a reinforcement learning model. The first AI model may be a foundation model (FM). The data about computing in edge node 503, network and operational environment may be collected in step 501. The collected data may be stored in a storage system 502 e.g., database. The collected data may be used to perform in step 505 an Input Mapping (IM) for reinforcement learning (RL). The IM method may map input data and other information to RL related states, actions and rewards. Given the computational and network environment, general information about how model split ratios can be constructed (number of layers, ratios in percent, etc.) and an evaluation for success and failure of the split inference, this IM method translates the aforementioned input data into RL based states (current operational situation), actions (chosen model re-split) and rewards (evaluation and rating). The results of the IM method may be used to perform in step 506 an adaptive split optimization (ASO) method. The ASO method may adaptively learn the best split ratio based on the current environment and performance demands, via Reinforcement Learning. Given the original FM architecture, information about the current edge node 503 computational and network situation, potential QoS, performance or security constraints and a mapping of those aforementioned to Reinforcement Learning (RL) related states, actions and rewards, this method implements a single-agent neural network to learn and derive the best split ratio $S^*=(S1^*, S2^*, S3^*)$ via a reward based RL evaluation. The learnt best split ratio may be used in step 507 to split the FM into input block S1, intermediate block S2 and output block S3. The input and output blocks S1 and S3 may be processed on the edge node 503 and the intermediate block S2 may be processed at a computer server in a cloud system 530. The method of FIG. 4 may further comprise a step 508 of performing the Policy Federation (PF) using the learnt split policy in step 507 and other learned model split policies 511 from other edge nodes. The Policy Federation may synchronize learned model split policies across similar edge nodes to obtain a better and more adaptive global policy. Given the local model split policies of each participating edge node and information about the frequency of the desired joint synchronization among those, this method implements a federated aggregation of said policies via Federated Learning (FL) to obtain a global set of policies which may be more robust as each participating node has collaboratively shared its respective knowledge. The global split policy may be sent (512) to the edge node 503.

Hence, as shown in FIG. 4, the first and last Foundation Model (FM) layers (S1 and S3) may be processed on the edge node and their intermediate cut-layer activations are securely transmitted, received and processed as the cloud environment remains unaware of any data and output labels and does not possess the complete FM. Inference thus may take place exclusively and securely at the edge node, making use of the cloud environment as a pure computing and processing instance for S2. In order to cope with varying and potentially detrimental computational and network situations at the edge while retaining a certain performance, service and security standard, the Reinforcement Learning (RL) based Adaptive Split Optimization (ASO) may be employed to adaptively learn the best model split ratio for the distributed split inference. To this, the current computing and network situation (among others) may need to be translated into appropriate RL based measures by an Input Mapping (IM). Additionally, a Policy Federation (PF) may be invoked to aggregate the learned policies and rules from nodes in a connected network, which target to perform a similar splitting task. Herewith, valuable knowledge can be shared to obtain an improved global policy.

Figure 5:
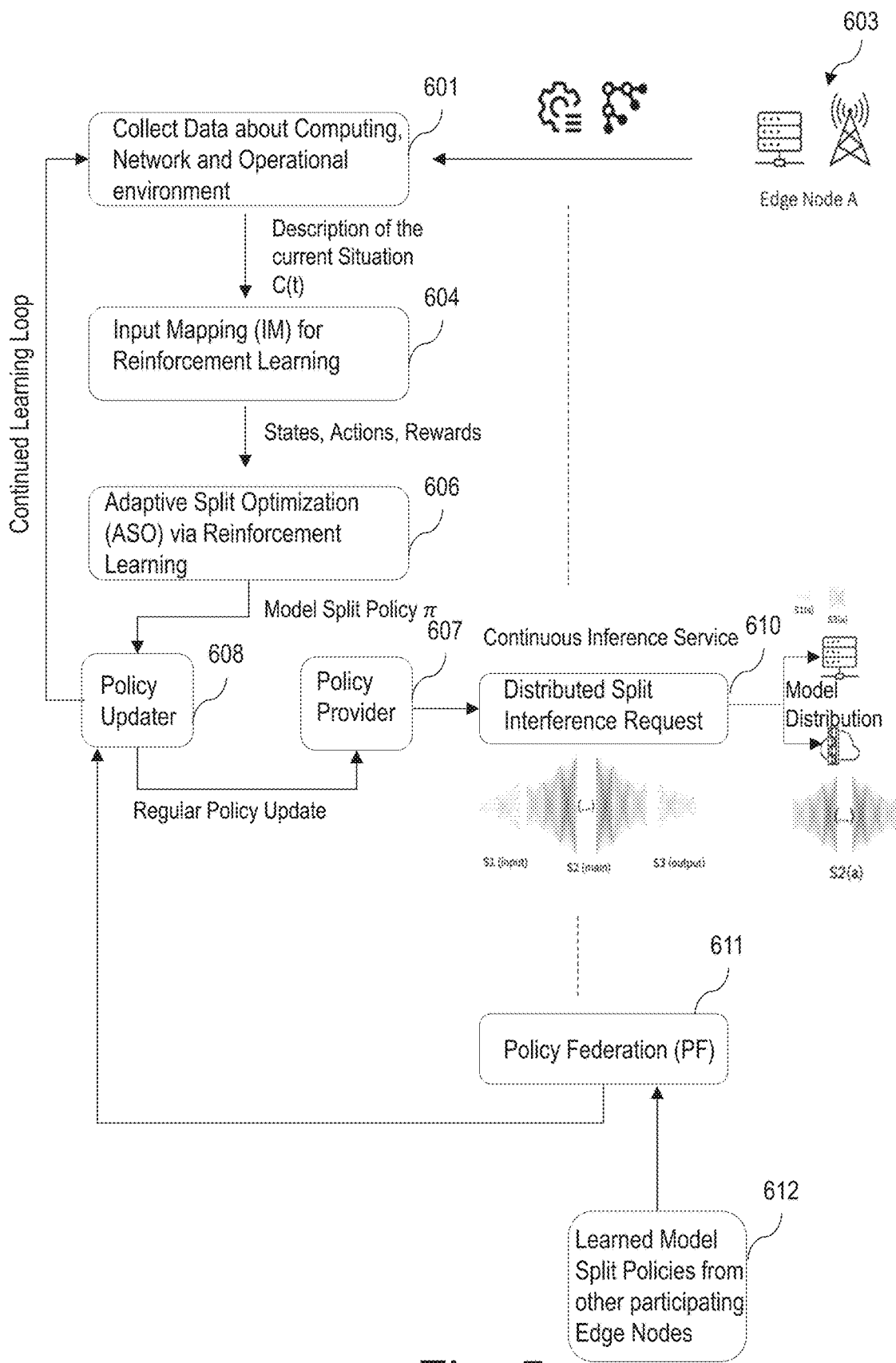
FIG. 5 is a diagram illustrating a method for executing workloads in a distributed system in accordance with at least one embodiment of the present disclosure.

FIG. 5 is a diagram illustrating a method for workload orchestration in a distributed system in accordance with an example of the present subject matter.

The second AI model may, for example, be a reinforcement learning model. The first AI model may be a foundation model (FM). The data about computing in edge node 603, network and operational environment may be collected in step 601. This may provide a description of the current situation. The collected data may be used to perform Input Mapping (IM) in step 604. The IM may map input data and other information to RL related states, actions and rewards. The collected data may, for example, comprise the following items 1) though 6): 1) a set of (MEC) edge node hardware specifications such as RAM, CPU, Memory, Cache, 2) information about the computational situation (hardware utilization, node occupation), 3) information about the network situation (link reliability, latency, data transfer speeds), 4) information about the FM architecture and how to perform a valid architecture dependent splitting, e.g. split after layer X; residual unit Y; attention head Z, 5) information about the desired split architecture between edge node and cloud server, e.g., U-shaped three-way splitting S=(S1, S2, S3) and 6) information and capacity to measure the total time duration for a successful inference processing, e.g., given as t_total=SUM_i(t_transmission_i)+SUM_j(t_processing_j). Using one or more items of the items 1) through 6), the Input Mapping may define RL-related states as: s=[computation_profile, network_profile, in-use_split_configuration], define actions as: a=[resplit_configuration] and define rewards as: r=[−t_total] by mapping the given information about the operational situation to numerical values which can be used as inputs for RL-based algorithms. This can be done by profiling, discretization, scaling and thresholding techniques as follows: computation_profile and network_profile alike may denote integer values between 1 and N (best to worst) based on a capacity profiling which describes the current availability of computational and network resources, respectively. Here, N is an adjustable granularity factor if more case distinctions are required. The capacity profiling can be realized by means of rule-based tables, voting systems or certain heuristics such as ones used in task scheduling and load balancing. The in-use_split_configuration denotes the FM split ratios, e.g., [0.2, 0.7, 0.1], being used for a U-shaped splitting of a large neural network. The resplit_configuration denotes the new current_split_configuration vector as part of the action taken in the RL process to adapt the model split to the current operational situation. Within this context, security related aspects such as thresholds for minimum processing ratios can be employed in order to guarantee robustness against model inversion attacks. The "−t_total" denotes the negative measurement of the total inference duration and is used as part of the RL process to evaluate and reward the current strategy/policy.

The resulting states, actions and rewards may be used for the Adaptive Split Optimization in step 606. The ASO method may adaptively learn the best split ratio based on the current environment and performance demands, via Reinforcement Learning. For example, given RL related states, actions and rewards for the current operational situation, provided by the Input Mapping method and given sufficient computing resources for the ASO, either on the edge device or at a monitoring instance/server connected to the edge, the Adaptive Split Optimization implements a scalable RL optimization process to cater to the large complexity blow-up when the number of states and actions becomes very large. To this, a Deep Q Learning which can be described as follows.

A Deep Q Neural Network (DQNN) may be used to process the RL task considering the available computing resources assigned to the ASO. The classical Bellman Equation for the Q value may be augmented, which measures the overall reward of an action taken within the system, by a weight vector w, which denotes the weights and parameters of the DQNN, i.e., $$Q(s_t, a_t, \omega) = r(s_t, a_t) + \alpha * \max_{a_{t+1}}[Q(s_{t+1}, a_{t+1}, \omega) - \beta * Q(s_t, a_t, \omega)],$$

where alpha [0, 1] is the discount factor, as usually employed in Q learning, and beta [0, 1] is an additional factor that might be employed to center the future reward estimate towards the measured value and can optionally be learned for better performance and stability. Using above Q-target function, proceed by defining a mean-squared-error (MSE) measure for the loss function of said DQNN, i.e., $$\mathcal{L} = Q_{estimated}(s_t, a_t, \omega) - \left(r(s_t, a_t) + \alpha * \max_{a_{t+1}}[Q(s_{t+1}, a_{t+1}, \omega) - \beta * Q(s_t, a_t, \omega)]\right).$$

Next, said DONN is trained based on available observations (some collected datasets) for a specified amount of epochs or until convergence, eventually yielding a policy π for optimal model splitting. For continuous learning, the ASO may copy the learned DQNN such that one instance of it can be used for further training with new observations (Policy Updater) and the other instance can be used as a standalone inference engine (Policy Provider 607) to infer the optimal model split ratio for the current operational situation. This mechanism can be realized as follows: While the Policy Provider 607 provides fast inference results, the Policy Updater 608 retrains the DQNN for the same input in parallel. After successful DQNN re-training at the Policy Updater 608, the new policy π* is accepted and the Policy Updater 608 and Policy Provider 607 synchronize their models. In a continuous loop, the Policy Updater 608 and Policy Provider 607 continue to train and provide inference, respectively, without disturbing the inference request 610 to obtain the optimal model split ratios. The FM may be split in response to the inference request 610 using policy provided by the Policy Provider 607. As indicated in FIG. 5, the split FM may be deployed or distributed on the edge node and the cloud system.

For example, the method of FIG. 5 may further comprise a step 611 of performing the Policy Federation (PF) using the learnt split policy from Policy Provider 607 and other learned model split policies 612 from other edge nodes. The policy federation method may synchronize learned model split policies across similar edge nodes to obtain a better and more adaptive global policy. The policy federation method may use inputs 1) through 3): 1) sufficient computing capabilities at an external FL aggregation server to process the Policy Federation, 2) information about participating edge nodes within a connected MEC region or Distributed FMaaS network and 3) information about the desired synchronization frequency of model split policies among said participating edge nodes. Given the inputs 1) through 3), the Policy Federation method may implement a Federated Learning process to aggregate the weights of the learned DQNNs without disturbing the local inference process by: issuing a request to each participant's Policy Provider to send a copy of their weights to the FL server, aggregating the weights via a specified FL aggregation strategy such as Federated Averaging, etc. and issuing a request to each participants Policy Updater to receive a copy of the globally federated DQNN model and to subsequently update the respective Policy Provider.

The present disclosure includes various aspects.

One aspect of the present disclosure includes a method for executing workloads in a distributed system using a first AI model, the distributed system comprising a set of first computer systems which are configured to connect to at least one second computer system of the distributed system, the first AI model being configured to receive a specific input, process the specific input and provide a specific output, the first AI model being configured to be split in accordance with a split configuration into a set of one or more input blocks, an intermediate block and a set of one or more output blocks, such that the set of one or more input blocks receive the specific input and provides an intermediate output, the intermediate block receives as input the intermediate output and provides another intermediate output, and the set of one or more output blocks receive as input the other intermediate output and provides said specific output; the method comprising a split method comprising: receiving a request to execute a workload using the first AI model, the workload comprising the specific input; determining a current resource utilization status in the distributed system; inputting, to a second AI model, the current resource utilization status and an in-use split configuration of the first AI model, the second AI model being configured for predicting a split configuration for the first AI model; receiving an output from the second AI, the output indicating a current split configuration for the first AI model; the method further comprising: splitting the first AI model using the current split configuration; deploying the split first AI model such that the input and output blocks may be executed on one or more first computer systems of the set of first computer systems and such that the intermediate block may be executed on a second computer system of the at least one second computer system; executing the workload.

Another aspect of the present disclosure includes the second AI model being a reinforcement learning model, wherein a state of the reinforcement learning model is defined by the current resource utilization status and an the in-use split configuration, wherein a policy of the reinforcement learning model defines an action to change the in-use split configuration of the first AI model.

Another aspect of the present disclosure includes the second AI model being trained in multiple first computer systems of the set of first computer systems in accordance with a federated learning technique.

Another aspect of the present disclosure includes the training comprising: combining learnable weights of the second AI models in the respective first computer systems, resulting in a combined second AI model, wherein the second AI model used in the split method is the combined second AI model.

Another aspect of the present disclosure includes wherein the current resource utilization status is defined by at least one of: utilization level of network resources of the distributed system; utilization level of resources of one or more of the first computer systems; utilization level of resources of the second computer systems.

Another aspect of the present disclosure includes the distributed system being a wireless communication system, wherein the first computer systems are multi-access edge computing (MEC) nodes, and the second computer system is a cloud system.

Another aspect of the present disclosure includes the method being repeatedly performed.

Another aspect of the present disclosure includes wherein the first AI model is a foundation model.

Another aspect of the present disclosure includes wherein the first AI model is a deep neural network or a transformer, wherein the input block represents first network layers, the intermediate block represents middle network layers; and the output block represents last network layers.

Another aspect of the present disclosure includes wherein the first computer system has an amount of processing resources which is smaller than the processing resources of the second computer system.

Another aspect of the present disclosure includes wherein the workload involves at least one of: data analytics, sensor measurement fusion from different sources, image analysis, processing data streams destined to a cloud or another internal or external workload.

Another aspect of the present disclosure includes wherein the executing of the first AI model comprises: executing each two consecutive blocks of the first AI model which are deployed on different computer systems by at least: encoding using an encoding protocol the output of a first block of the two blocks, and sending the encoded output to the first computer system or to the second computer system in order to be used as input for a second block of the two blocks.

Another aspect of the present disclosure includes wherein the encoding protocol comprises at least one of compression or encryption.

Another aspect of the present disclosure includes the second AI model being a Deep Q Neural Network (DQNN).

Another aspect of the present disclosure includes the method being repeatedly performed, wherein the split method further comprises: retraining an instance of the second AI model; and upon a successful retraining, using the retrained second AI model instead of the second AI model for further execution of the split method.

Another aspect of the present disclosure includes the deploying comprising: using the current resource utilization status to define a deployment configuration, the deployment configuration indicating a second computer system to execute the intermediate block, and one or more first computer systems to execute the input and output blocks; and using the deployment configuration for the deployment.

Another aspect of the present disclosure includes defining the deployment configuration comprising: performing a capacity profiling of the first and second computer systems to determine a capability of each of the first and second computer systems to execute one or more blocks of the first AI model; and defining the deployment configuration based on the capacity profiling.

Figure 6:
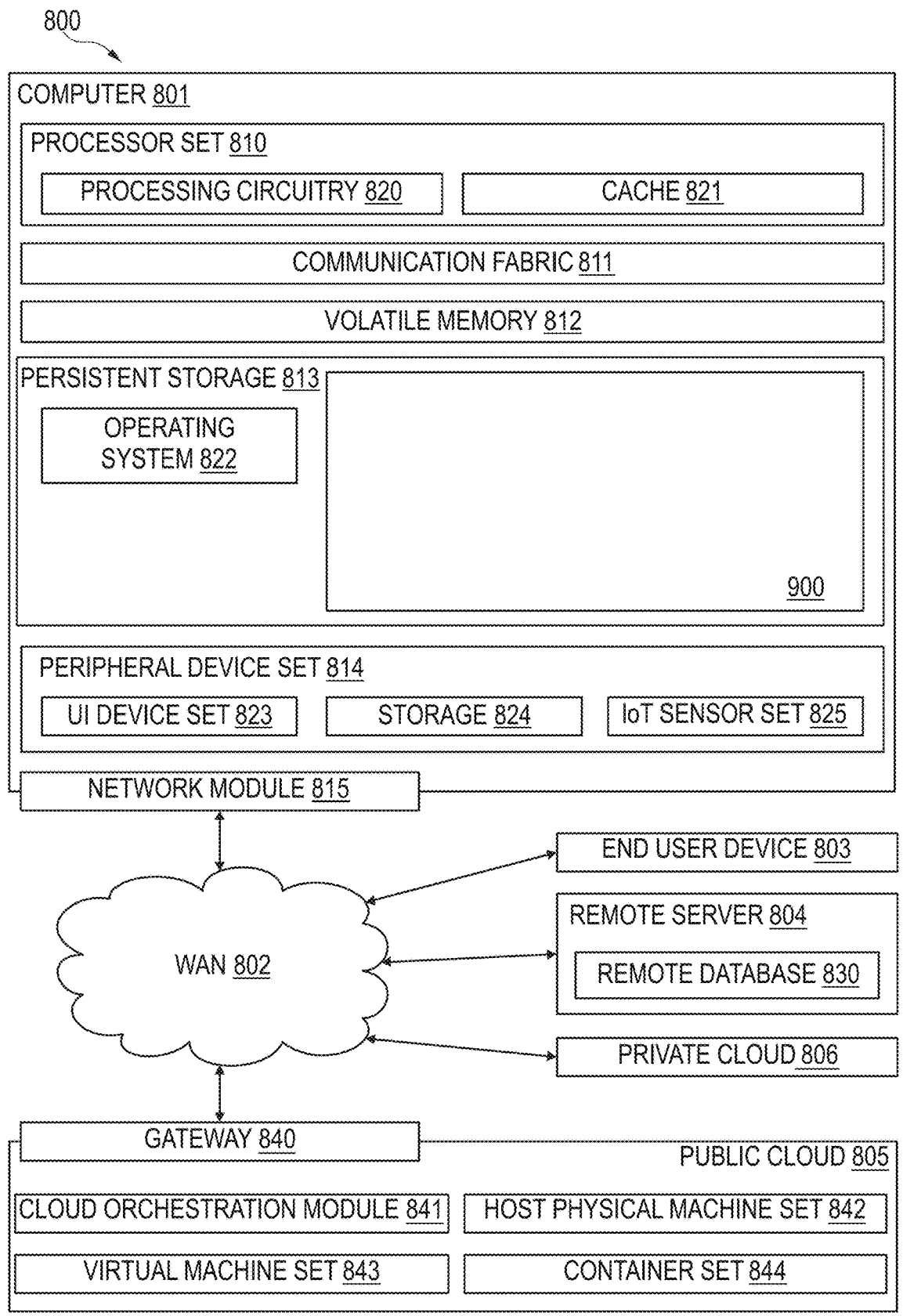
FIG. 6 is a diagram illustrating a computing environment in accordance with at least one embodiment of the present disclosure.

FIG. 6 illustrates a computing environment in accordance with at least one embodiment. Computing environment 800 contains an example of an environment for the execution of at least some of the computer code involved in performing the inventive methods, such as code 900 for workload orchestration. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 6. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
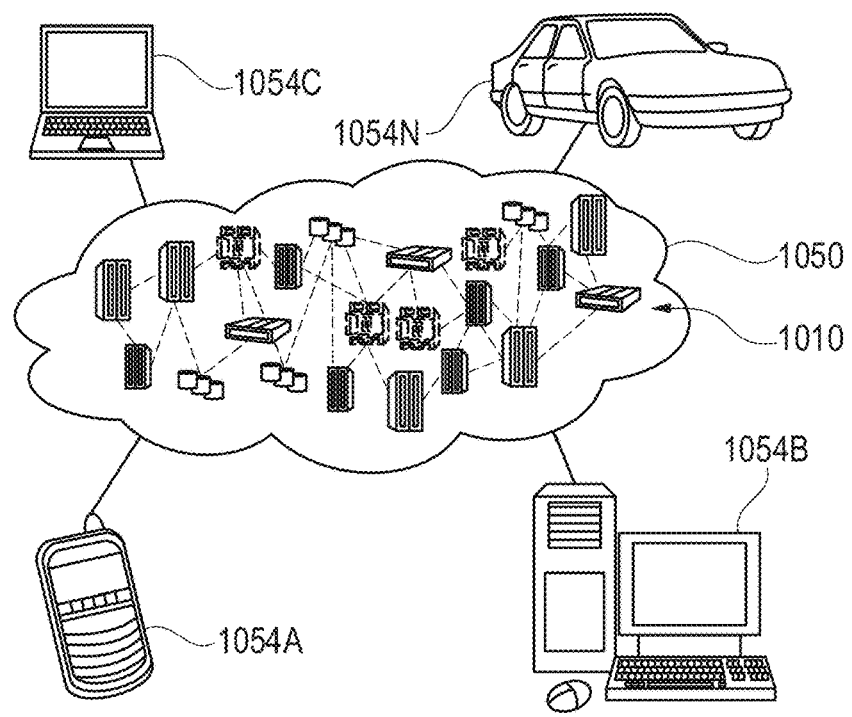
FIG. 7 is a diagram illustrating a cloud computing environment according to at least one embodiment of the present disclosure.

Referring now to FIG. 7, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 54N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 7 are intended to be illustrative only and that computing nodes 1010 and cloud computing environment 1050 can communicate with any type of computerized device over any type of network and/or network addressable connection (e.g., using a web browser).

Figure 8:
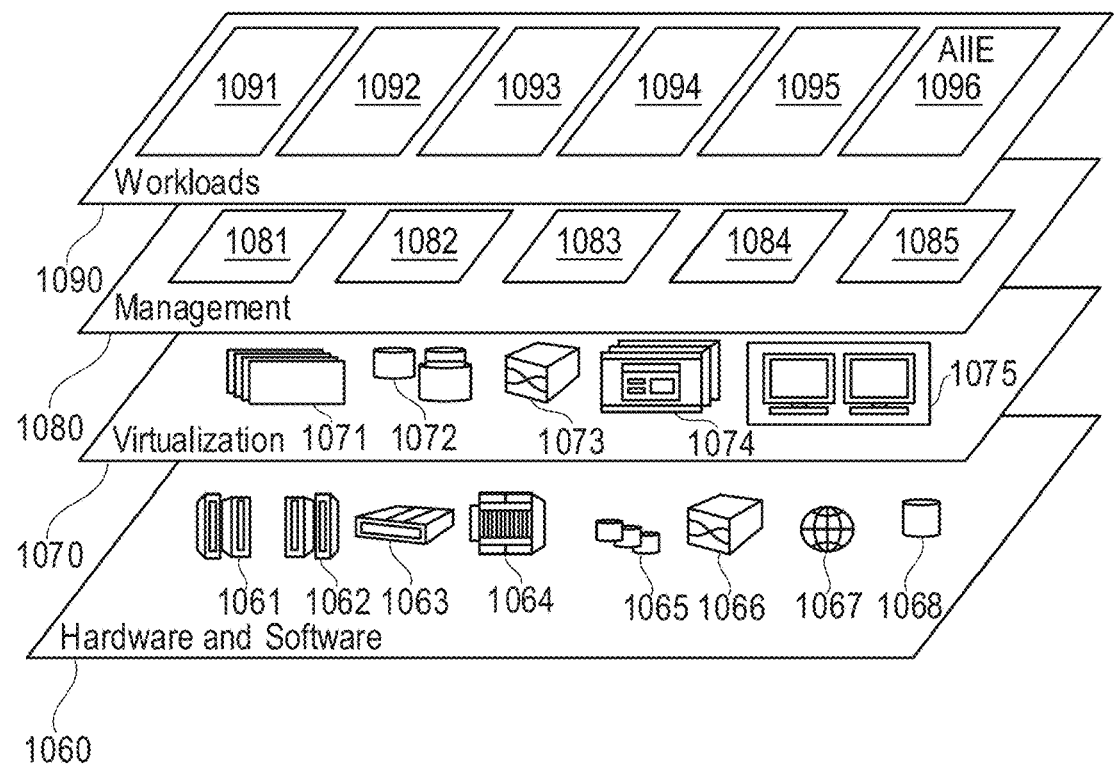
FIG. 8 is a diagram illustrating abstraction model layers according to at least one embodiment of the present disclosure.

Referring now to FIG. 8, a set of functional abstraction layers provided by cloud computing environment 1050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a AI model inference engine (AIIE) 1096 that executes the main block of the first AI model in accordance with the present subject matter.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A method for executing workloads in a distributed system using a first artificial intelligence (AI) model, comprising:
    the distributed system comprising a set of first computer systems which are configured to connect to at least one second computer system of the distributed system,
    the first AI model being configured to receive a specific input, process the specific input and provide a specific output, the first AI model being configured to be split in accordance with a split configuration into a set of one or more input blocks, an intermediate block, and a set of one or more output blocks, such that the set of one or more input blocks receive the specific input and provides an intermediate output, the intermediate block receives as input the intermediate output and provides another intermediate output, and the set of one or more output blocks receive as input the other intermediate output and provides said specific output;
    the method further comprising:
    receiving a request to execute a workload using the first AI model, the workload comprising the specific input;
    determining a current resource utilization status in the distributed system;
    inputting, to a second AI model, the current resource utilization status and an in-use split configuration of the first AI model, the second AI model being configured for predicting a split configuration for the first AI model;
    receiving an output from the second AI model, the output indicating a current split configuration for the first AI model;
    splitting the first AI model using the current split configuration;
    deploying the split first AI model such that the at least one input block and the at least one output block is executed on the set of first computer systems and such that the intermediate block is executed on the at least one second computer system; and
    executing the workload.

2. The method of claim 1, wherein the second AI model includes a reinforcement learning model, wherein a state of the reinforcement learning model is defined by the current resource utilization status and the in-use split configuration, and wherein a policy of the reinforcement learning model defines an action to change the in-use split configuration of the first AI model.

3. The method of claim 1, the second AI model being trained in multiple first computer systems of the set of first computer systems in accordance with a federated learning technique.

4. The method of claim 3, wherein the second AI model being trained further comprises:
    combining learnable weights of the second AI model in respective first computer systems, resulting in a combined second AI model, wherein the second AI model used to output the current split configuration for the first AI model is the combined second AI model.

5. The method of claim 1, wherein the current resource utilization status is defined by at least one of:
    a utilization level of network resources of the distributed system;
    a utilization level of resources of the set of first computer systems; and a utilization level of resources of the at least one second computer system.

6. The method of claim 1, wherein the distributed system includes a wireless communication system, wherein the set of first computer systems includes multi-access edge computing (MEC) nodes, and the at least one second computer system includes a cloud system.

7. The method of claim 1, wherein the first AI model includes a foundation model.

8. The method of claim 1, wherein the first AI model includes a deep neural network or a transformer, wherein the at least one input block represents first network layers, the intermediate block represents middle network layers, and the at least one output block represents last network layers.

9. The method of claim 1, wherein the first AI model includes a transformer, wherein the at least one input block includes first network layers, the intermediate block includes middle network layers, and the at least one output block includes last network layers.

10. The method of claim 1, wherein the set of first computer systems includes a first amount of processing resources which is smaller than a second amount of processing resources of the at least one second computer system.

11. The method of claim 1, wherein the workload involves at least one of: data analytics, sensor measurement fusion from different sources, image analysis, processing data streams destined to a cloud or another internal or external workload.

12. The method of claim 1, wherein the executing of the first AI model comprises: executing each two consecutive blocks of the first AI model which are deployed on different computer systems by at least: encoding using an encoding protocol an output of a first block of the two blocks, and sending the encoded output to the first computer system or to the second computer system in order to be used as input for a second block of the two blocks.

13. The method of claim 12, wherein the encoding protocol comprises at least one of compression or encryption.

14. The method of claim 1, wherein the second AI model includes a Deep Q Neural Network (DQNN).

15. The method of claim 1, further comprising:
retraining an instance of the second AI model; and
upon a successful retraining, using the retrained second AI model instead of the second AI model for further execution of the current split configuration.

16. The method of claim 1, wherein deploying the split first AI model further comprises:
using the current resource utilization status to define a deployment configuration, the deployment configuration indicating the at least one second computer system to execute the intermediate block and the set of first computer systems to execute the at least one input block and the at least one output block; and
using the deployment configuration for the deployment.

17. The method of claim 16, wherein defining the deployment configuration further comprises:
performing a capacity profiling of the first and second computer systems to determine a capability of each of the first and second computer systems to execute one or more blocks of the first AI model; and
defining the deployment configuration based on the capacity profiling.

18. A computer program product for executing workloads in a distributed system, using a first artificial intelligence (AI) model, comprising:
one or more computer-readable storage media and program instructions collectively stored on the one or more computer-readable storage media, the program instructions executable by a processor to cause the processor to perform a method comprising:
the distributed system comprising a set of first computer systems which are configured to connect to at least one second computer system of the distributed system,
the first AI model being configured to receive a specific input, process the specific input and provide a specific output, the first AI model being configured to be split in accordance with a split configuration into a set of one or more input blocks, an intermediate block, and a set of one or more output blocks, such that the set of one or more input blocks receive the specific input and provides an intermediate output, the intermediate block receives as input the intermediate output and provides another intermediate output, and the set of one or more output blocks receive as input the other intermediate output and provides said specific output;
the method further comprising:
receiving a request to execute a workload using the first AI model, the workload comprising the specific input;
determining a current resource utilization status in the distributed system;
inputting, to a second AI model, the current resource utilization status and an in-use split configuration of the first AI model, the second AI model being configured for predicting a split configuration for the first AI model;
receiving an output from the second AI model, the output indicating a current split configuration for the first AI model;
splitting the first AI model using the current split configuration;
deploying the split first AI model such that the at least one input block and the at least one output block is executed on the set of first computer systems and such that the intermediate block is executed on the at least one second computer system; and
executing the workload.

19. A computer system for executing workloads in a distributed system, using a first artificial intelligence (AI) model:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
the distributed system comprising a set of first computer systems which are configured to connect to at least one second computer system of the distributed system,
the first AI model being configured to receive a specific input, process the specific input and provide a specific output, the first AI model being configured to be split in accordance with a split configuration into a set of one or more input blocks, an intermediate block, and a set of one or more output blocks, such that the set of one or more input blocks receive the specific input and provides an intermediate output, the intermediate block receives as input the intermediate output and provides another intermediate output, and the set of one or more output blocks receive as input the other intermediate output and provides said specific output;

the method further comprising:
receiving a request to execute a workload using the first AI model, the workload comprising the specific input;
determining a current resource utilization status in the distributed system;
inputting, to a second AI model, the current resource utilization status and an in-use split configuration of the first AI model, the second AI model being configured for predicting a split configuration for the first AI model;
receiving an output from the second AI model, the output indicating a current split configuration for the first AI model;
splitting the first AI model using the current split configuration;
deploying the split first AI model such that the at least one input block and the at least one output block is executed on the set of first computer systems and such that the intermediate block is executed on the at least one second computer system; and
executing the workload.

20. The computer system of claim 19, wherein the computer system includes a first computer system of the set of first computer systems.

* * * * *